United States Patent
Tanaka

[15] 3,696,718
[45] Oct. 10, 1972

[54] EXPOSURE ADJUSTING DEVICE IN A CAMERA

[72] Inventor: Harumi Tanaka, Kobe, Japan
[73] Assignee: Minolta Camera Co., Ltd., Osaka, Japan
[22] Filed: Dec. 1, 1970
[21] Appl. No.: 93,959

[30] Foreign Application Priority Data

Dec. 1, 1969 Japan ................. 44/114527

[52] U.S. Cl. .................. 95/10 C, 95/64 R
[51] Int. Cl. .............................. G03b 7/12
[58] Field of Search ............. 95/10 C, 64 R

[56] References Cited

UNITED STATES PATENTS 3,043,202  7/1962  Hahn ................. 95/10 C
3,301,153  1/1967  Hisanori .............. 95/10 C Primary Examiner—Joseph F. Peters, Jr.
Attorney—Watson, Cole, Grindle & Watson

[57] ABSTRACT

A exposure adjusting device in a camera making use of an ammeter, wherein in a camera which automatically controls the exposure on the basis of deflection angles of the pointer of said ammeter, in accordance with the brightness of an object, and wherein the manual exposure is controlled manually adjusting the pointer position against the returning tendency of said ammeter pointer, the engagement between the ammeter pointer and exposure selection member, in the manual exposure condition, is ensured by impressing a voltage, of opposite polarity to that of the automatic exposure control on said ammeter when adjusting the exposure selection member for manual exposure.

4 Claims, 3 Drawing Figures

EXPOSURE ADJUSTING DEVICE IN A CAMERA

The present invention relates to an exposure adjusting device in a camera and more particularly relates to an exposure adjusting device which is adjustable between automobile exposure control, in accordance with the deflection angle of the ammeter pointer, and manual exposure control by setting up manually the position of said ammeter pointer by means of the exposure selection member.

BACKGROUND OF THE INVENTION

The automatic exposure control in a camera making use of an ammeter, for example, for determining the diaphragm value, the means for manually setting up the exposure quantity, for example the diaphragm value, is already known. In many of such cameras there are disposed in parallel an automatic control mechanism responsive to the deflection angle of the ammeter and a manual control mechanism, and by selecting between the automatic exposure control and the manual exposure control only one of said mechanisms is operated. Therefore, when one of said mechanisms in parallel, for example the automatic control mechanism, is put to use the other mechanism, namely, manual control mechanism is idle, that is, one of said mechanisms is always idle. In small cameras (35 mm camera, 16 mm camera, etc) the fact that such mechanisms one of which is always idle, are built in the camera in which space is restricted, is very disadvantageous in designing the camera.

Whereas, in a cine-camera there has been proposed a device such that the automatic exposure control is effected by the diaphragm blade driven by the movable coil of the ammeter, and when the manual exposure set up is selected the terminal of the ammeter is short-circuited and, at the same time, the arm portion on the tip of the manual set up mechanism comes into contact with the pointer of the movable coil of the ammeter to turn it manually against the coil spring for returning said movable coil, so as to effect the manual exposure control. In such a device, however, the turning force of the coil spring for returning the movable coil is weak, so that the movable coil is vibrated by even a light shock, and loses contact with the arm portion on the tip of the manual control mechanism, and accordingly the manual control is not correctly transmitted. Moreover, the return speed of the pointer of the movable coil is slow. In this situation the higher the sensitivity of the ammeter, the greater is the inertia of the pointer, and accordingly said return speed becomes slower, so that in case of an abrupt change to the manual control mechanism, especially to a change to the direction for increasing the exposure quantity, the proper follow-up becomes impossible resulting in a time lag. In addition, the turning force of the movable coil of an ammeter is weak, so that it is impossible to operate the diaphragm mechanism of a still camera directly through the driving force of the movable coil.

OBJECT OF THE INVENTION

One object of the present invention is to eliminate the drawbacks mentioned above, and to provide an exposure adjusting device in a camera provided with both a manual exposure control mechanism and an automatic exposure control mechanism.

Another object of the present invention is to provide an exposure adjusting device in a camera, which facilitates the change over of the exposure control from automatic exposure control, making use of an ammeter, to manual exposure control, and ensures the accuracy of the manual exposure control.

Another object of the present invention is to provide an exposure adjusting device as described in the preceding paragraph in which, in the case of the manual exposure, a driving torque is electrically applied to assist the returning force exerted by the coil spring of the movable coil for the ammeter to improve the contact between the ammeter pointer and the manual exposure control mechanism and thus enable the proper manual exposure value to be quickly fixed.

The other objects of the present invention will be clear from the description of the embodiment disclosed hereinafter.

DESCRIPTION OF THE EMBODIMENT

Figure 1:
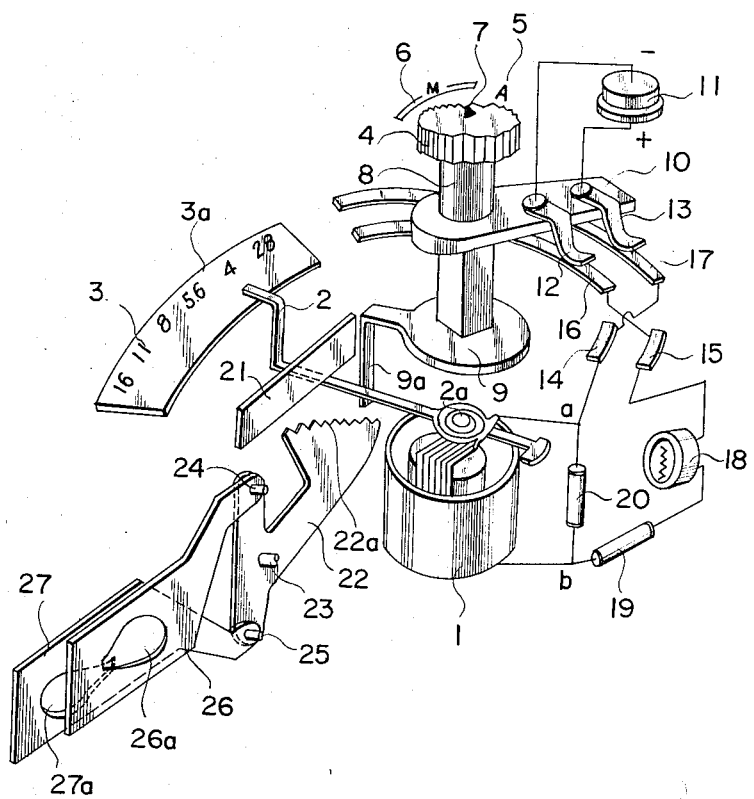
FIG. 1 is an exploded perspective diagrammatic view showing the essential portion of an embodiment in accordance with the present invention.
Figure 2:
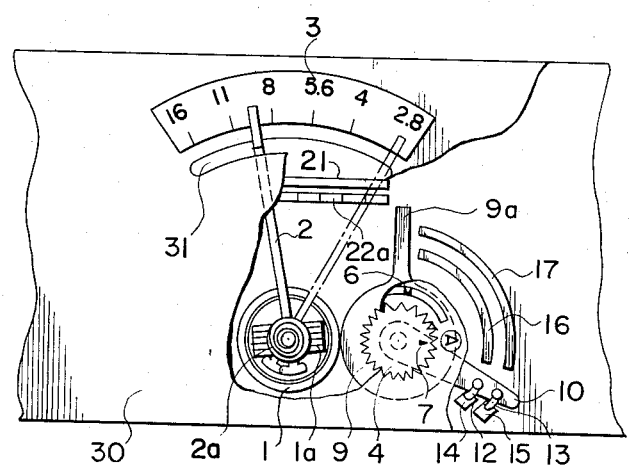
FIG. 2 is a top view showing the arrangement of the essential parts for automatic exposure control in the embodiment shown in FIG. 1.
Figure 3:
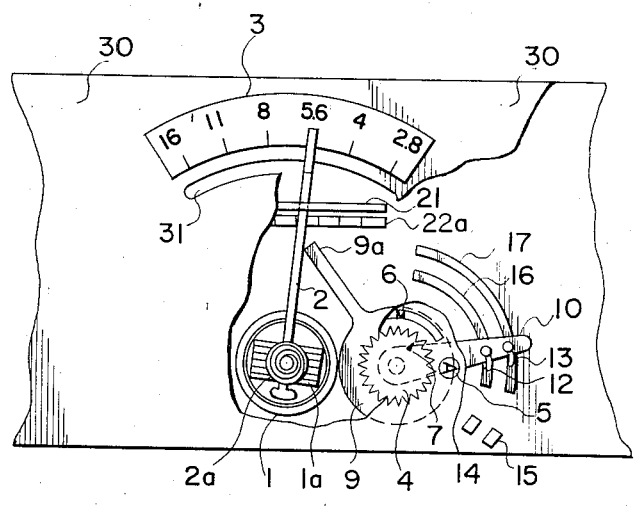
FIG. 3 is a top view showing the arrangement of the essential parts for manual exposure control in the embodiment shown in FIG. 1.

In FIG. 1, pointer 2 supported by movable coil 1a of ammeter 1, built in the camera body, has a tip projecting from an arc-shaped slot 31 provided in the upper frame 30 of the camera (FIG. 2) onto said upper frame 30, so as to indicate on dial plate 3, on said upper frame 30, as shown in FIG. 2 and FIG. 3. On said dial plate 3 there are graduated diaphragm openings designations 3a. And, 2a is a coil spring for returning movable coil 1a for ammeter 1.

Exposure selection member 4 for selecting between the automatic exposure control and the manual exposure control and for setting the desired exposure value in the manual exposure range has indicator 7 facing a scale mark 5 for indicating automatic exposure control position A and mark 6 for manual exposure range M said indicator 7 is supported rotatably on upper frame 30 by pin 8. To said pin 8 there are fixed insulating plate 10 and pointer turning member 9.

Said pointer turning member 9 has an arm portion 9a projected therefrom and when indicator 7 of exposure selection member 4 faces scale mark 5 denoting automatic exposure control A, said arm portion 9a is located outside the range of deflection angle of pointer 2 of ammeter 1 and cannot contact pointer 2. When said indicator 7 faces to mark 6 denoting the manual exposure range M said arm portion 9a comes into contact with pointer 2 to urge it counter to its returning tendency, so as to cause it to indicate the desired exposure on diaphragm scale 3a.

The insulating plate 10 carries two sliding contact pieces 12, 13 in parallel with each other. In the path of said sliding contact pieces 12, 13, which turn with exposure selection member 4 there are provided fixed on the camera body, automatic exposure control contact pieces 14, 15 and arc-shaped contact pieces 16, 17 for the manual exposure control respectively, and when indicator 7 of exposure selection member 4 faces scale mark 5 denoting automatic exposure control A, said sliding contact pieces 12, 13 come into contact respectively with automatic exposure control contact pieces 14, 15; and when said indicator 7 faces mark 6 denoting the manual exposure range M, said sliding contact pieces 12, 13 come into contact respectively with arc-shaped contact pieces 16, 17 for the manual exposure.

The positive pole and the negative pole of power source 11 are connected respectively to sliding contact pieces 12, 13, and arc-shaped contact piece 16 for manual exposure control is connected to automatic exposure contact piece 15. The arc-shaped contact piece 17 for manual exposure control is connected to the other automatic exposure contact piece 14, and between automatic exposure control contact pieces 14, 15 movable coil 1a of ammeter 1 and photoconductive element 18 are connected in series. Numeral 19 designates a resistance connected in series to photoconductive element 18, and numeral 20 is a resistance connected in parallel with both terminals of movable coil 1a, both of which resistances adjust the deflection angle characteristic of pointer 2 of ammeter 1 for the intensity of light coming into photoconductive element 18.

Numeral 21 designates a holding-down plate provided above pointer 2 and to the camera body, and numeral 22 is a detection plate provided with stepped saw-tooth portion 22a for detecting the position of pointer 2 and is of the three-armed shape shown. It is supported rotatably on the camera body by pin 23. Upon the initial stroke of the shutter release mechanism (not shown) said detection plate 22 turns counter-clockwise, as is well known, to hold and fix pointer 2 between pointer holding-down plate 21 and stepped saw-tooth portion 22a, and the turning angle of detection plate 22 varies depending upon the position of pointer 2.

Symmetrically to each side of pin 23 there are secured pins 24, 25 on which diaphragm plates 26, 27 are supported, respectively. Said diaphragm plates 26, 27 are movable in parallel from side to side by means of upper and lower guide rails not shown in the drawing, and said diaphragm plates 26, 27 are formed with holes 26a, 27a therethrough. These holes are of comet-shape from the larger diameter to the smaller diameter and extend in opposite directions. Thus, in accordance with the turning angle of detection plate 22, both diaphragm plates 26, 27 move along the guide rails in opposite directions and the diaphragm opening is defined by the position of both diaphragm holes 26a, 27a.

In the operation of the present invention as described above, when exposure selection member 4 is turned so that indicator 7 points to "A" indicating automatic exposure control as shown in FIG. 2, arm portion 9a of pointer turning member 9 recedes from the deflection angle range of pointer 2. Sliding contact pieces 12, 13 come into contact respectively with automatic exposure control contact pieces 14, 15, and movable coil 1a of ammeter 1 is energized by the current flowing from photoconductive element 18 with the normal polarity, and movable coil 1a turns pointer 2 (counter-clockwise in the drawing) in accordance with the current from photoconductive element 18, against the resistance of returning coil spring 2a and stops it at the position where coil spring 2a is balanced (in FIG. 2, about F:9). Due to an interlocking relation with the release operation, at the initial stroke of the latter the detection plate 22 turns counter-clockwise in FIG. 1 and pointer 2 is gripped between pointer holding-down plate 21 and stepped saw-tooth portion 22a of detection plate 22, and the opening formed by diaphragm holes 26a, 27a of diaphragm plates 26, 27 is controlled for about F:9 to effect the automatic exposure control.

On the other hand, when said exposure selection member 4 is turned counter-clockwise and indicator 7 faces mark 6 of the manual exposure range M, arm portion 9a of pointer turning member 9 is turned within the deflection angle range of pointer 2 to come into contact with pointer 2 to turn it. At this juncture, pointer 2 is given a clockwise turning force by returning coil spring 2a and the current flowing from photoconductive element 18 is of opposite polarity to that at the time of the automatic exposure control, is impressed onto movable coil 1a of ammeter 1, so that movable coil 1a is given a clockwise driving force. Therefore, the contact pressure between arm portion 9a and pointer 2 corresponds to the sum of the clockwise returning force of coil spring 2a plus the clockwise driving force of movable coil 1a, so as to improve the follow-up property of pointer 2 relative to arm portion 9a.

When the desired diaphragm value is 5.6, exposure selection member 4 is turned so that pointer 2 indicates 5.6 on dial plate 3. After the diaphragm opening is determined thus, just as the shutter is released detection plate 22 moves to restrain pointer 2 at the 5.6 position and the desired manual exposure at F5.6 is effected.

In the described embodiment the selected automatic exposure control or manual exposure control is effectuated by adjusting the diaphragm opening. However, by means of the same selection member, ammeter pointer, and detection plate the shutter speed can be automatically controlled or manually selected as well, and also it is possible to effect what is called program adjustment by adjusting simultaneously the diaphragm and the shutter speed.

What is claimed is:

1. An exposure adjusting device in a camera having both manual exposure control and automatic exposure control including an ammeter, comprising:
 a photoconductive element;
 said ammeter being connected in series to said photoconductive element;
 an exposure selection member for selecting between the automatic exposure control and the manual exposure control, and in the manual exposure control range, for determining an optional exposure value;
 a pointer turning member and a change-over switch integral with said selection member; and
 a movable detection plate for detecting the position of the ammeter pointer upon the initial stroke of the shutter release, the extent of movement of said plate being dependent upon the pointer position: wherein, when said exposure selection member is adjusted for automatic exposure control said pointer turning member recedes from the deflection angle range of the pointer, said change-over switch impresses a current in accordance with the resistance value of the photoconductive element and of the normal polarity onto the ammeter, said ammeter turns its pointer against its returning coil spring, and said detection plate detects the position of said pointer and controls automatically an exposure adjusting member, and when said exposure selection member is adjusted for manual exposure control said pointer turning member is turned into the deflection angle range of the pointer to come into contact with said pointer, said change-over switch impresses a current of the opposite polarity, in accordance with the resistance value of the photoconductive element, onto the ammeter, said ammeter pointer is driven in the same direction as urged by the conventional returning coil spring, said pointer being thus maintained in contact with the pointer turning member, and said detection plate detects the position of said pointer to effect the manually selected exposure.

2. An exposure adjusting device as claimed in claim 1, wherein said change-over switch comprises:
an insulating plate fixed to the exposure selection member;
two sliding contact pieces provided on said insulating plate and connected respectively to the positive and negative poles of a power source;
two automatic exposure control conductive pieces fixed to the camera body with which the respective sliding contact pieces come into contact when said exposure selection member is adjusted for automatic exposure control, and connected respectively to the opposite poles of the photoconductive element and to terminals of the ammeter; and
two arc-shaped conductive pieces for the manual exposure control fixed to the camera body with which said sliding contact pieces come into contact when said exposure selection member is adjusted for manual exposure control, said automatic exposure control conductive pieces and said arc-shaped conductive pieces for the manual exposure control being cross-connected, whereby said change-over switch changes the polarity of the current flow from the photoconductive element to the ammeter.

3. An exposure adjusting device in a camera making use of an ammeter, which comprises:
a photoconductive element;
an ammeter connected in series with said photoconductive element;
a diaphragm opening selection member for selecting between automatic diaphragm control and manual diaphragm control, and for determining an optional diaphragm value in the manual diaphragm control range;
a pointer turning member and a change-over switch fixed to said diaphragm opening selection member;
a movable detection plate for detecting the position of the ammeter pointer upon the initial stroke of the shutter release, the extent of movement of said plate being dependent upon the pointer position; and
a diaphragm adjusting mechanism actuated in response to the movement of said detection plate, whereby when said diaphragm opening selection member is adjusted for automatic diaphragm control, said pointer turning member recedes from the deflection angle range of the pointer, said change-over switch impresses a current in accordance with the resistance value of the photoconductive element and of the normal polarity on the ammeter, said ammeter turns its pointer against its returning coil spring, and said detection plate detects the position of said pointer and controls automatically a diaphragm opening adjusting mechanism, and when said diaphragm opening selection member is adjusted for manual diaphragm control said pointer turning member is turned into the deflection angle range of the pointer to come into contact with said pointer, said change-over switch impresses a current of the opposite polarity, in accordance with the resistance value of the photoconductive element, onto the ammeter, said ammeter pointer is driven in the same direction as urged by the conventional returning coil spring, said pointer being thus maintained in contact with said pointer turning member, said detection plate detects the position of said pointer, and in accordance with the movement of said detection plate the diaphragm value of the diaphragm adjusting mechanism is determined.

4. An exposure adjusting device as claimed in claim 3, wherein said pointer moves relative to a dial plate graduated with the diaphragm values within the deflection range of said pointer, and when said diaphragm opening selection member is adjusted for automatic diaphragm control the pointer position determined by the opposing forces of the returning coil spring and the ammeter, energized by the current in accordance with the resistance value of the photoconductive element, indicates the diaphragm value reached by the diaphragm adjusting mechanism, due to the movement of the detection plate, and when said diaphragm opening selection member is adjusted for manual diaphragm control the position of the pointer effected by the pointer turning member against the combined forces of the returning coil spring for the ammeter and the ammeter energized by the current of opposite polarity, in accordance with the resistance value of the photoconductive element indicates the diaphragm value reached by the diaphragm adjusting mechanism due to the movement of the detection plate.

* * * * *